United States Patent
Prior et al.

(10) Patent No.: US 8,286,424 B2
(45) Date of Patent: Oct. 16, 2012

(54) THERMOELECTRIC GENERATOR COOLING SYSTEM AND METHOD OF CONTROL

(75) Inventors: Gregory P. Prior, Birmingham, MI (US); Gregory P. Meisner, Ann Arbor, MI (US); Daniel B. Glassford, Dryden, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 383 days.

(21) Appl. No.: 12/753,144

(22) Filed: Apr. 2, 2010

(65) Prior Publication Data

US 2011/0239635 A1 Oct. 6, 2011

(51) Int. Cl.
*F01N 5/02* (2006.01)
*H02N 10/00* (2006.01)

(52) U.S. Cl. .............. 60/320; 60/298; 60/321; 136/205; 310/53; 310/54; 310/56; 310/58; 310/306

(58) Field of Classification Search .............. 60/298, 60/320–321; 136/205; 310/52–60 A, 306
See application file for complete search history.

(56) References Cited

U.S. PATENT DOCUMENTS

| | | | |
|---|---|---|---|
| 5,625,245 A | 4/1997 | Bass | |
| 5,753,383 A | 5/1998 | Cargnelli et al. | |
| 6,986,247 B1 * | 1/2006 | Parise | 60/284 |
| 7,051,522 B2 | 5/2006 | Yang et al. | |
| 2005/0172992 A1 * | 8/2005 | Shimoji et al. | 136/208 |
| 2005/0172993 A1 * | 8/2005 | Shimoji et al. | 136/208 |
| 2009/0139556 A1 * | 6/2009 | Bell et al. | 136/201 |
| 2011/0239964 A1 * | 10/2011 | Prior | 123/41.08 |
| 2011/0258995 A1 * | 10/2011 | Limbeck et al. | 60/320 |

* cited by examiner

*Primary Examiner* — Thomas Denion
*Assistant Examiner* — Jesse Bogue
(74) *Attorney, Agent, or Firm* — Quinn Law Group, PLLC

(57) ABSTRACT

An apparatus is provided that includes a thermoelectric generator and an exhaust gas system operatively connected to the thermoelectric generator to heat a portion of the thermoelectric generator with exhaust gas flow through the thermoelectric generator. A coolant system is operatively connected to the thermoelectric generator to cool another portion of the thermoelectric generator with coolant flow through the thermoelectric generator. At least one valve is controllable to cause the coolant flow through the thermoelectric generator in a direction that opposes a direction of the exhaust gas flow under a first set of operating conditions and to cause the coolant flow through the thermoelectric generator in the direction of exhaust gas flow under a second set of operating conditions.

13 Claims, 5 Drawing Sheets

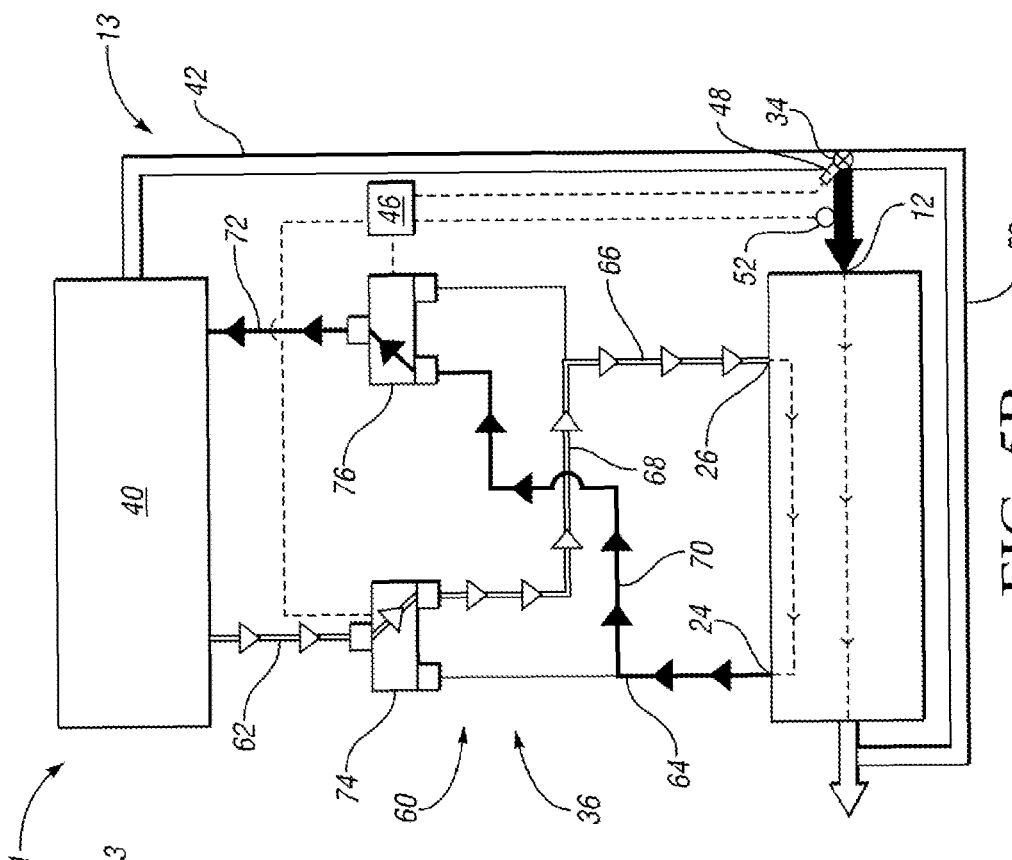
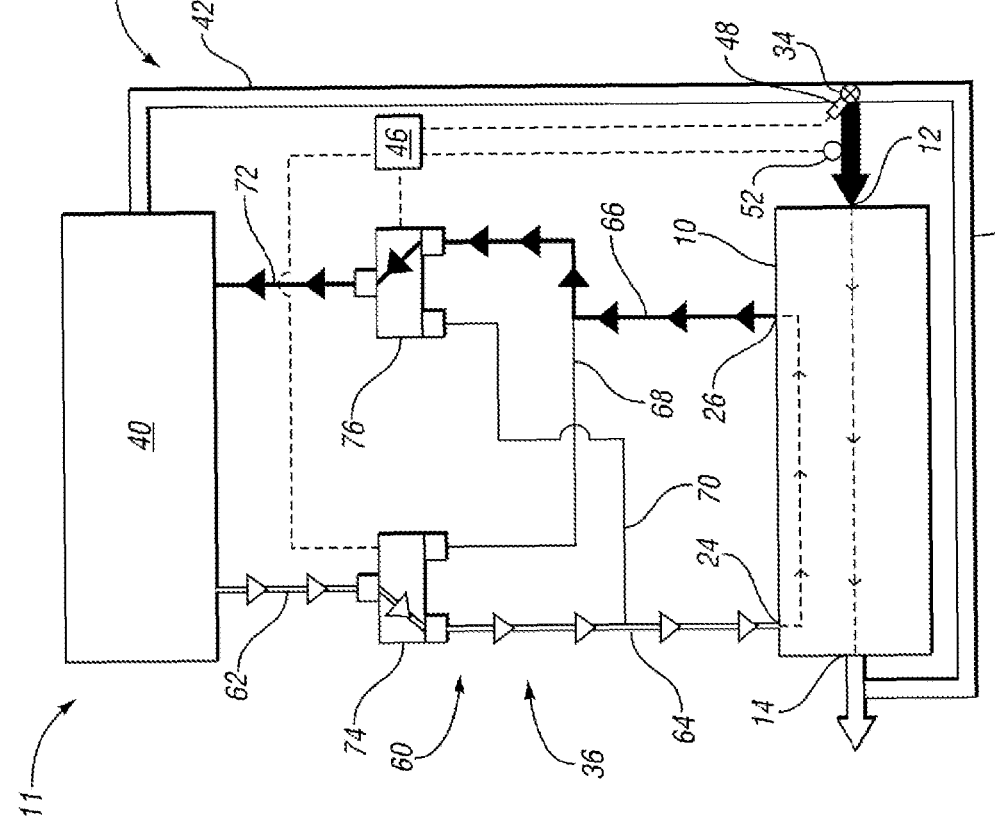
FIG. 5A
FIG. 5B

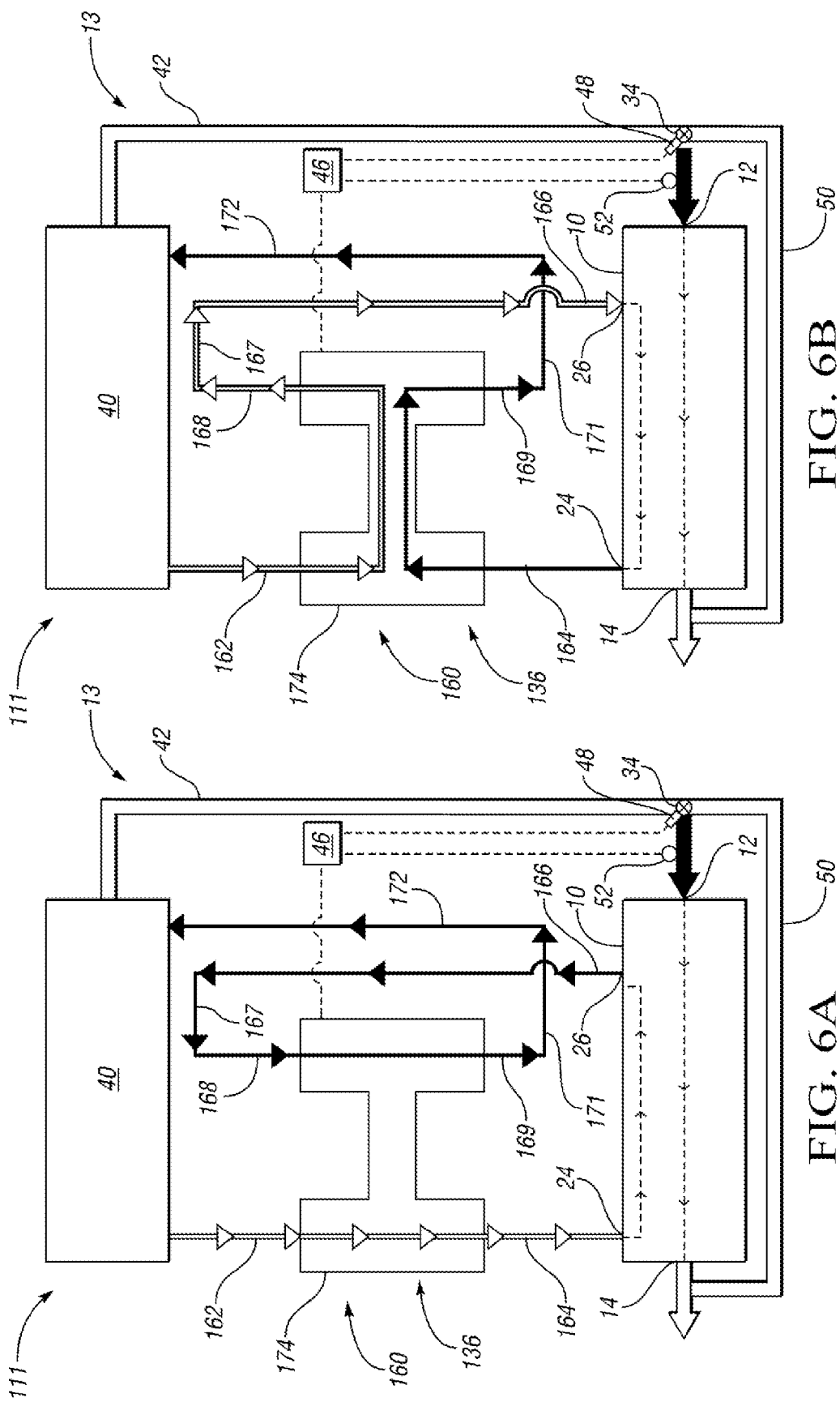

US 8,286,424 B2

THERMOELECTRIC GENERATOR COOLING SYSTEM AND METHOD OF CONTROL

STATEMENT REGARDING FEDERALLY SPONSORED RESEARCH OR DEVELOPMENT

This invention was made with government support under Department of Energy Agreement number DE-FC26-04NT42278. The government may have certain rights in the invention.

TECHNICAL FIELD

The invention relates to a cooling system and method of control thereof for a thermoelectric generator.

BACKGROUND OF THE INVENTION

Recovery of vehicle exhaust heat otherwise expelled from a vehicle can improve the efficiency of various vehicle systems and improve fuel economy. For example, vehicle exhaust heat has been used to warm engine coolant, especially after a cold start of the engine. Furthermore, a thermoelectric generator can be integrated into a vehicle exhaust system to produce electrical energy from a temperature differential created by the exhaust heat. However, thermoelectric generators are sensitive to overheating, so exhaust heat flow to the thermoelectric generator must be limited when temperature of the thermoelectric generator approaches or reaches a maximum operating temperature.

SUMMARY OF THE INVENTION

An apparatus is provided that includes a thermoelectric generator and an exhaust gas system operatively connected to the thermoelectric generator to heat a portion of the thermoelectric generator with exhaust gas flow through the thermoelectric generator. A coolant system is operatively connected to the thermoelectric generator to cool another portion of the thermoelectric generator with coolant flow through the thermoelectric generator, thereby creating a temperature differential. At least one valve is controllable to cause the coolant flow through the thermoelectric generator in a direction that opposes a direction of the exhaust gas flow under a first set of operating conditions and to cause the coolant flow through the thermoelectric generator to be in the same direction as the exhaust gas flow under a second set of operating conditions. For example, the first set of operating conditions may be sensed temperature below a predetermined temperature, such as the temperature of metal in a hot side heat sink of the TEG, the temperature of the exhaust gas below a predetermined temperature, engine loading below a predetermined engine load, or other operating conditions that may be indicative of temperature within the TEG. The second set of operating conditions may be sensed temperature above a predetermined temperature, such as the temperature of metal in a hot side heat sink of the TEG, the temperature of the exhaust gas above a predetermined temperature, engine loading above a predetermined engine load, or other operating conditions that may be indicative of temperature within the TEG.

In order to accomplish the reversibility of the direction of coolant flow through the thermoelectric generator, the thermoelectric generator may be provided with two cooling ports, a first of which is nearer to an exhaust gas outlet of the thermoelectric generator than to an exhaust gas inlet of the thermoelectric generator, and a second of which is nearer to the exhaust gas inlet than to the exhaust gas outlet. The valve or valves may be positioned in a coolant circuit and movable between a first position and a second position. The valve or valves are in the first position under the first set of operating conditions and are in the second position under the second set of operating conditions. The valve or valves direct coolant flow through the thermoelectric generator from the first coolant port to the second coolant port when in the first position and direct coolant flow through the thermoelectric generator from the second coolant port to the first coolant port when in the second position.

Furthermore, a bypass valve may be provided that is movable to direct at least a portion of the exhaust gas flow away from the thermoelectric generator under a third set of operating conditions, such as when sensed metal temperature of the TEG is above another predetermined temperature which may be the maximum recommended operating temperature for the thermoelectric generator, when exhaust gas temperature at the exhaust inlet of the thermoelectric generator is above a selected temperature, or when engine loading is above another predetermined engine load for a given period of time.

A method of controlling temperature of a thermoelectric generator in an automotive exhaust gas system includes directing coolant in a first direction through the thermoelectric generator under the first set of operating conditions, and directing coolant in a second direction opposing the first direction through the thermoelectric generator under a second set of operating conditions. The exhaust gas flows through the thermoelectric generator in the second direction under both the first and the second sets of operating conditions. The method may include sensing the operating conditions, and directing coolant in the first or the second direction by actuating a valve in response to the sensed operating conditions.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 5A is a schematic illustration of an automotive exhaust system with the thermoelectric generator of FIGS. 1 and 2 and a first embodiment of a coolant system showing the direction of coolant flow opposing the direction of exhaust gas flow under the first set of operating conditions;

FIG. 5B is a schematic illustration of the automotive exhaust system with the thermoelectric generator of FIG. 5A showing the direction of coolant flow the same as the direction of exhaust gas flow under a second set of operating conditions;

FIG. 6A is a schematic illustration of an automotive exhaust system with the thermoelectric generator of FIGS. 1 and 2 and a second embodiment of a coolant system showing the direction of coolant flow opposing the direction of exhaust gas flow under the first set of operating conditions;

FIG. 6B is a schematic illustration of the automotive exhaust system with the thermoelectric generator of FIG. 6A showing the direction of coolant flow being the same as the direction of exhaust gas flow under the second set of operating conditions;

DETAILED DESCRIPTION OF THE INVENTION

Figure 1:
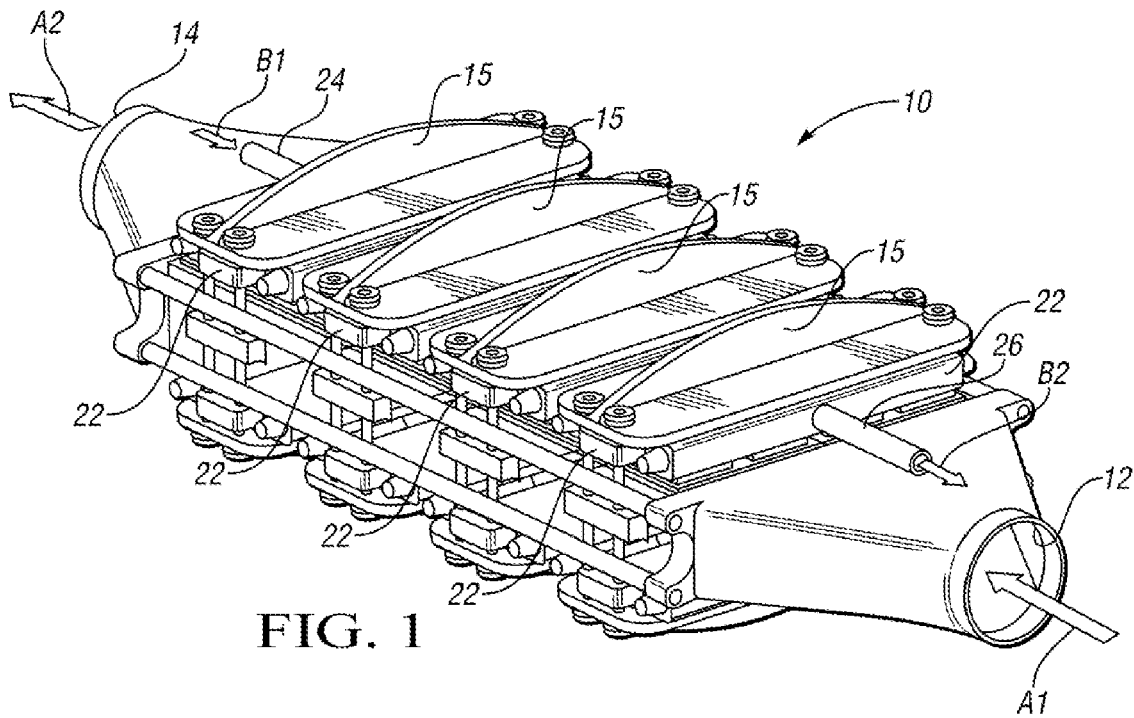
FIG. 1 is a schematic perspective illustration of a first embodiment of a thermoelectric generator.
Figure 2:
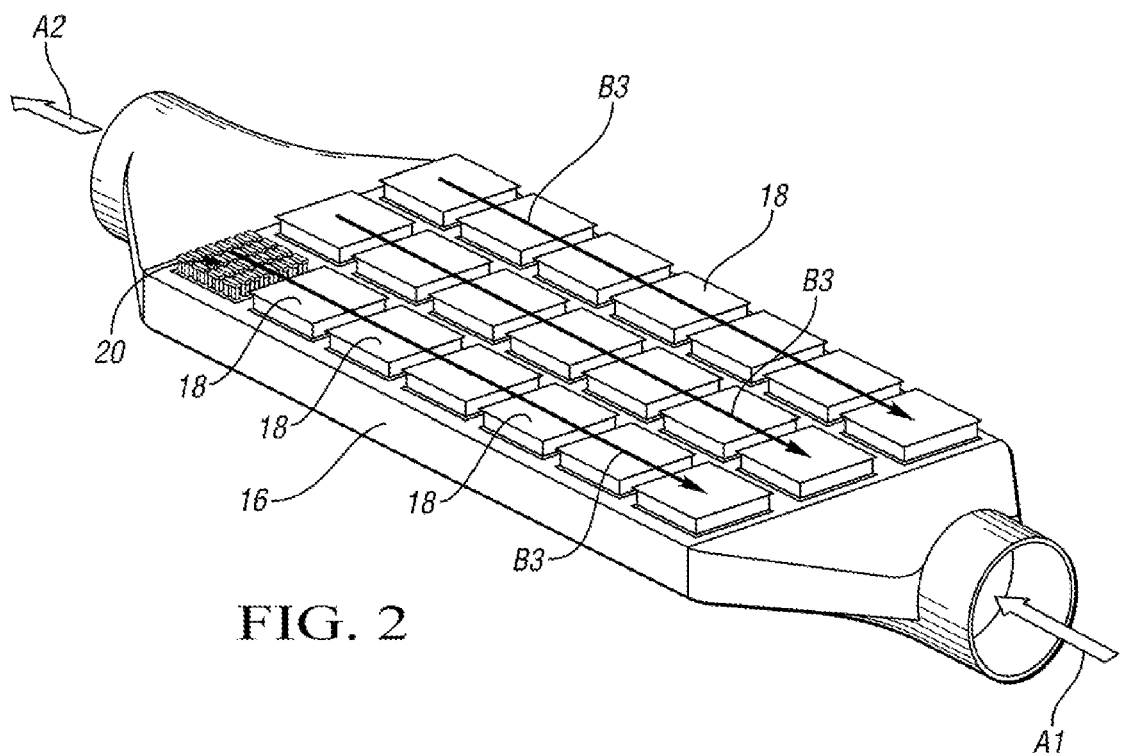
FIG. 2 is a schematic perspective illustration of the thermoelectric generator with portions removed to reveal a direction of coolant flow therethrough.

Referring to the drawings, wherein like reference numbers refer to like components, FIG. 1 shows an exemplary thermoelectric generator (TEG) 10. The TEG 10 is used in an apparatus 11, such as an automotive system, but not limited to such, to produce electrical energy from exhaust heat as explained herein. The TEG 10 has an exhaust gas inlet 12 and an exhaust gas outlet 14 which permit exhaust gas to flow through the TEG 10 generally in the direction of the arrows A1 and A2. Arrow A1 represents exhaust gas entering the TEG 10, while arrow A2 represents exhaust gas exiting the TEG 10. Referring to FIG. 2, stiffening ribs 15, coolant ports 24, 26 (discussed below) and other components of the TEG 10 are removed to reveal a heat sink 16, generally referred to as a hot side heat sink 16, through which the exhaust gas flows from the inlet 12 to the outlet 14. A plurality of TEG modules 18 are mounted between the hot side heat sink 16 and heat sink 22, interconnected portions of which are visible in FIG. 1, referred to as a cold side heat sink 22.

The TEG 10 has a first coolant port 24 and a second coolant port 26 arranged to permit coolant flow through the cold side heat sink 22. The coolant ports 24, 26 are shown in FIG. 1 arranged coaxially with the exhaust inlet 12 and exhaust outlet 14. Alternatively, the coolant ports 24, 26 may be arranged to enter and exit laterally through the cold side heat sink 22, perpendicular to the arrangement shown. In either arrangement, coolant will flow over the TEG modules 18 in the direction indicated with arrows B3 in FIG. 2, or opposite to the direction shown in FIG. 2, as discussed below. Coolant, represented by arrow B1 enters the first coolant port 24 and exits the second coolant port 26, as represented by arrow B2. The coolant flows through the TEG 10 as represented by arrows B3 in FIG. 2, contained in coolant passages (not shown). The flow of coolant through the TEG 10 is substantially opposite to the direction of flow of the exhaust heat through the TEG 10 when the coolant enters through first coolant port 24 and exits through second coolant port 26. The flow of coolant will be in the direction of arrows B3 under a first set of operating conditions, which may be sensed temperature of metal in the hot side heat sink 16 below a predetermined temperature, the temperature of the exhaust gas below a predetermined temperature, engine loading below a predetermined engine load as indicated by engine rpm, exhaust air pressure or flow rate, or other operating conditions that may be indicative of temperature within the TEG.

Each module 18 contains a plurality of solid state elements 20 shown in FIG. 2 that generate electrical energy in response to a temperature differential, as is understood by those skilled in the art. Some of the exhaust heat is absorbed by the hot side heat sink 16. The coolant reduces the temperature of the cold side heat sinks 22. Thus, a temperature differential is created across the TEG modules 18, so that the TEG modules 18 generate electrical power.

The TEG 10 converts thermal energy to electrical energy most efficiently if the temperature differential created across each of the TEG modules 18 is relatively equal. Furthermore, the temperature of all portions of the TEG modules 18 must not exceed a maximum recommended operating temperature for extended periods of time. The maximum recommended operating temperature is referred to herein as a critical temperature TC above which the TEG 10 may become inoperable.

Figure 3:
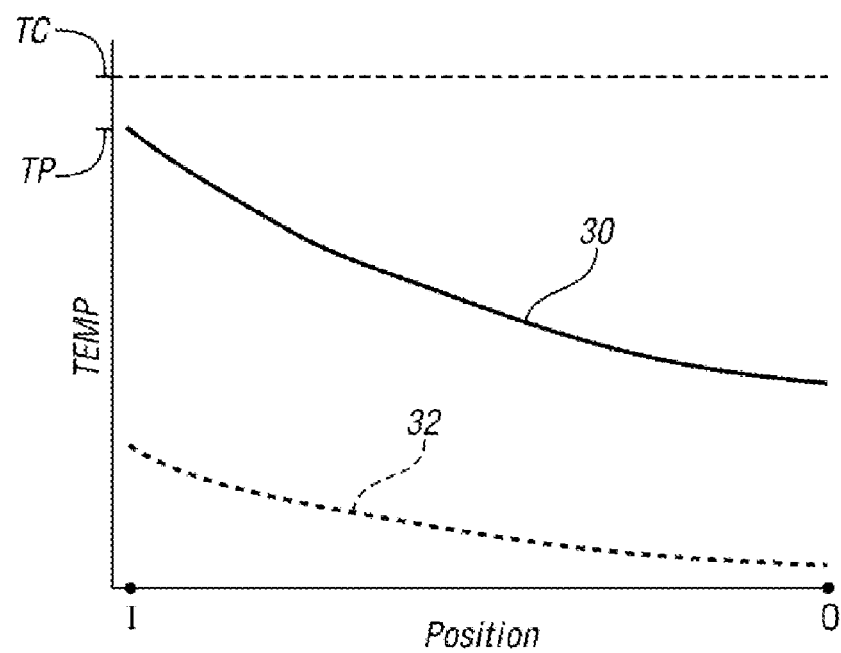
FIG. 3 is a plot of temperature within the thermoelectric generator and temperature of coolant within the thermoelectric generator versus distance along the exhaust flow path through the thermoelectric generator when the direction of coolant flow opposes the direction of exhaust flow.

Referring to FIG. 3, a typical temperature profile of the heat sink 16, and thus a hot side of the TEG modules 18, is represented by curve 30. Curve 30 indicates that the temperature of the heat sink 16 and hot side of heat modules 18 decreases from the exhaust gas inlet 12, represented at I, to the exhaust gas outlet 14, represented at O. Curve 32 represents the temperature of the coolant as it flows from the first coolant port 24 to the second coolant port 26 (i.e., from the modules nearest the exhaust outlet 14 to the modules nearest the exhaust inlet 12), according to the direction of flow arrows B3 in FIG. 2. The temperature differential at each position along the TEG 10 from the exhaust inlet 12, represented at I, to the exhaust outlet 14, represented at O, is relatively consistent, as shown by the relatively equal vertical difference between the curves 30, 32 at any position.

As is evident in FIG. 3, the temperature of the exhaust gas at the inlet 12, i.e., the temperature at position I, should be such that the temperature of the TEG 10 remains below a maximum recommended operating temperature TC, referred to herein as a preselected temperature. If the temperature of the TEG 10 increases above temperature TC, the temperature of the heat sink 16 and hot side of modules 18 could cause the modules 18 not to perform as expected. At such temperatures, at least a portion of the exhaust gas must be diverted from the TEG 10, as explained below using a bypass valve 34, shown in FIGS. 5A-6B, as is understood by those skilled in the art. This prevents damage to the TEG 10, but does not capture the heat energy of the diverted exhaust gas.

Figure 4:
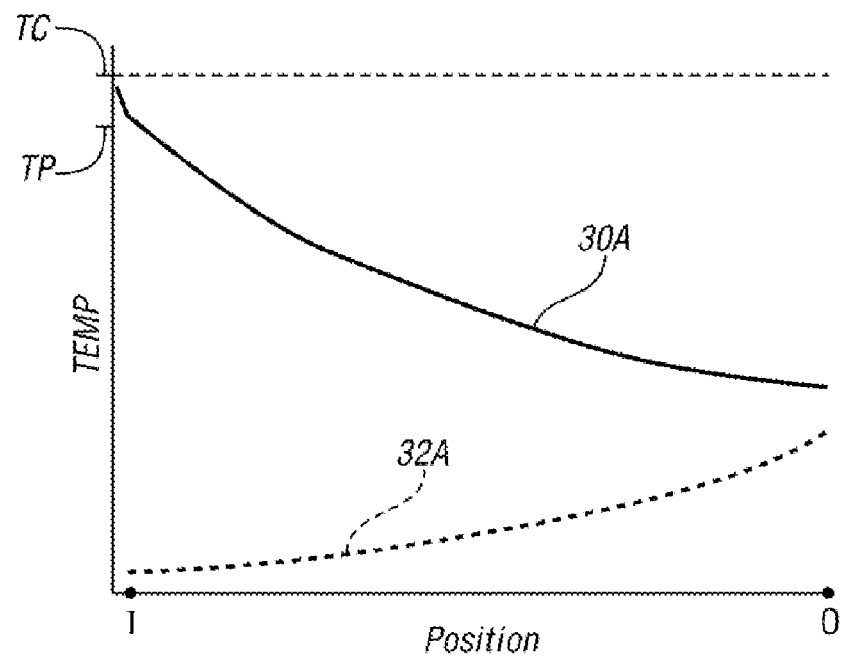
FIG. 4 is a plot of temperature within the thermoelectric generator and temperature of coolant within the thermoelectric generator versus distance along the exhaust flow path through the thermoelectric generator when the direction of coolant flow is the same as the direction of exhaust flow.

With the TEG control system apparatus 36 of FIGS. 5A-5B, or the TEG control system apparatus 136 of FIGS. 6A-6B, the direction of coolant flow through the TEG 10 can be reversed so that flow is from the second coolant port 26 to the first coolant port 24, as represented by curve 32A of FIG. 4. In other words, coolant flow through the TEG 10 will be in the same direction as exhaust gas flow through the TEG 10. The coolant will enter through the second coolant port 26, and thus will be at its lowest temperature and able to have a maximum cooling effect on the portion of the TEG (i.e., hot side heat sink 16 and TEG modules 18) closest to the exhaust gas inlet 12, represented at I, which is at the highest temperature in the TEG 10. Thus, under a second set of vehicle operating conditions, temperature of hot side heat sink 16 is represented by curve 30A. The second set of vehicle operating conditions may be relatively high engine loading for a given period of time, which correlates with a high flow rate of exhaust gas, or under relatively high exhaust gas temperature conditions, or other operating conditions that result in temperature of the hot side heat sink 16 near the inlet 12 greater than a predetermined temperature TP but still less than the critical temperature TC. Reversing the coolant flow direction under the second set of vehicle operating conditions can keep the maximum temperature within the TEG 10 below the temperature TC, and thereby allow the TEG 10 to capture exhaust heat and generate electrical energy over a broader range of vehicle operating conditions.

Referring now to FIG. 5A, the TEG 10 is shown with exhaust gas flowing therethrough as represented by the flow arrows connecting exhaust gas inlet 12 and exhaust gas outlet 14. The TEG also has coolant flowing therethrough in a first direction, in this case from the first coolant port 24 to the second coolant port 26, as represented by flow arrows substantially opposing the direction of flow of the exhaust gas.

The apparatus 11 includes an exhaust gas system 13 through which the exhaust gas is exhausted after combustion occurs in an engine 40. The exhaust gas is routed through one or more exhaust gas passages 42 to the TEG 10. The bypass valve 34 is operatively connected to a controller 46 and has an actuator 48 movable from a position to cause the bypass valve 34 to direct the exhaust gas to the exhaust gas inlet 12 or to a position in which the exhaust gas bypasses the TEG 10 through a bypass passage 50. The position of the bypass valve 34 is determined at least in part on the expected temperature of the TEG 10, which may be measured by a metal temperature sensor (not shown) within the TEG 10 such as on the hot side heat sink near the exhaust gas inlet 12, the temperature of the exhaust gas at the exhaust gas inlet 12, or just upstream thereof, as measured by a temperature sensor 52, engine loading as measured by the average number of engine revolutions per minute (rpm) over a given period of time, or other operating conditions indicative of temperature of the hot side heat sink 16 of the TEG 10. In the embodiment shown, the temperature sensor 52 is operatively connected to the controller 46 and is configured to send a sensor signal indicative of exhaust temperature to the controller 46. The controller 46 is configured to send a control signal to the actuator 48 based on the sensor signal. The bypass valve 34 is controlled to direct exhaust gas flow to the TEG 10 when the sensed temperature indicates that temperature within the TEG 10 is less than the predetermined temperature TP.

The apparatus 11 also includes a coolant system 60 configured to maintain the temperature within the TEG 10 below the critical temperature TC over a broad range of operating conditions so that the bypass valve 34 does not direct the exhaust gas to bypass the TEG 10 under those conditions. The coolant system 60 includes a plurality of coolant flow passages 62, 64, 66, 68, 70 and 72. A first coolant flow valve 74 and a second coolant flow valve 76 are operatively connected to the controller 46 and actuate in response to a control signal from the controller 46 to direct coolant flow through the coolant flow passages, thus establishing the direction of coolant flow through the TEG 10, as explained herein. In this embodiment, each of the coolant flow valves 74, 76 is a Y-type valve, having three ports and two internal branches to selectively direct flow in two different directions through the valve. Y-type valves are well understood by those skilled in the art.

In FIG. 5A, each of valves 74 and 76 is shown in a respective first position. In the first position, valve 74 directs coolant flow from passage 62 out of the engine 40 to the coolant flow passage 64. Coolant then flows through TEG 10 in the first direction shown, opposing the direction of exhaust gas flow through the TEG 10, and through passage 66 and valve 76 to passage 72 and back to the engine 40. The valves 74, 76 are controlled to establish the first positions of FIG. 5A under the first set of operating conditions, e.g., when sensed metal temperature of the TEG 10 is below a predetermined temperature TP shown in FIG. 3, when the exhaust gas temperature sensed by sensor 52 is not greater than a predetermined temperature correlated with the temperature TP of the heat sink 16, or when engine loading is not above a predetermined level for a given amount of time.

When the first set of operating conditions indicate that the temperature of the TEG 10 is greater than the predetermined temperature TP but still less than the critical temperature TC, the controller 46 sends control signals to move the valves 74, 76 to respective second positions shown in FIG. 5B. In the second position, valve 74 directs coolant flow from the engine 40 through passage 62 to passage 68 and passage 66 to enter the TEG 10 at the second coolant port 26 and flow through the TEG 10 in the second direction substantially the same as the direction of exhaust gas flow. Coolant then exits the TEG 10 at the first coolant port 24 and flows through a portion of passage 64, passage 70 to valve 76 where coolant is directed back to the engine 40 through passage 72.

When the temperature sensed by the temperature sensor 52 is greater than critical temperature TC, the controller 46 actuates the bypass valve 34 so that all or a portion of the exhaust gas is directed to coolant passage 50, bypassing the TEG 10. This reduces the amount of heat flowing into the TEG 10 and allows the temperature to decrease below temperature TC. The valves 74, 76, bypass valve 34, sensor 52, controller 46 and coolant flow passages 62, 64, 66, 68, 70 and 72 define the control system apparatus 36 which increases the exhaust heat recovery and conversion to electrical energy through the TEG 10.

Referring to FIGS. 6A and 6B, another apparatus 111 includes many of the same components as apparatus 11, but with a single H-type valve 174 movable between a first position represented in FIG. 6A and a second position represented in FIG. 6B. The coolant system 160 includes a plurality of coolant flow passages 162, 164, 166, 167, 168, 169, 171, and 172. A first coolant flow valve 174 is operatively connected to the controller 46 and actuates in response to a control signal from the controller 46 to direct coolant flow through the coolant flow passages, thus establishing the direction of coolant flow through the TEG 10, as explained herein.

When in the first position, the valve 174 directs coolant flow from the engine 40 through passage 162 to passage 164, and through the TEG 10 from the first coolant port 24 to the second coolant port 26 in a direction opposing the direction of exhaust flow. Coolant then flows through passage 166, passage 167, passage 168, passage 169, 171, and passage 172 to the engine 40.

When in the second position shown in FIG. 6B, the valve 174 directs coolant flow from the engine 40 through passage 162 to passages 168, 167 and 166, and through the TEG 10 from the second coolant port 26 to the first coolant port 24 in a direction substantially the same as the direction of exhaust flow. Coolant then flows through passages 164, passage 169, passage 171, and passage 172 to the engine 40.

Figure 8:
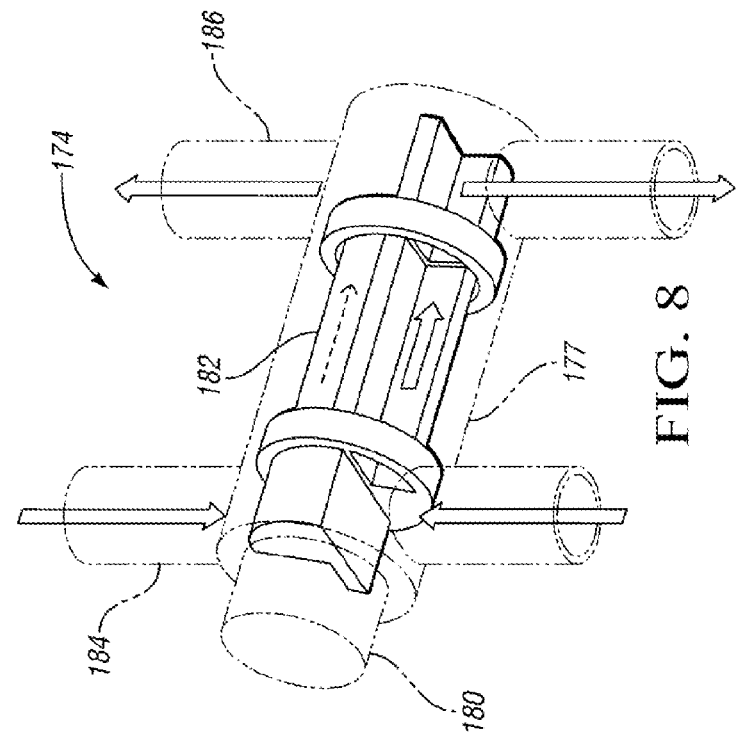
FIG. 8 is a schematic perspective illustration of the valve of FIG. 7 shown in a second position.
Figure 7:
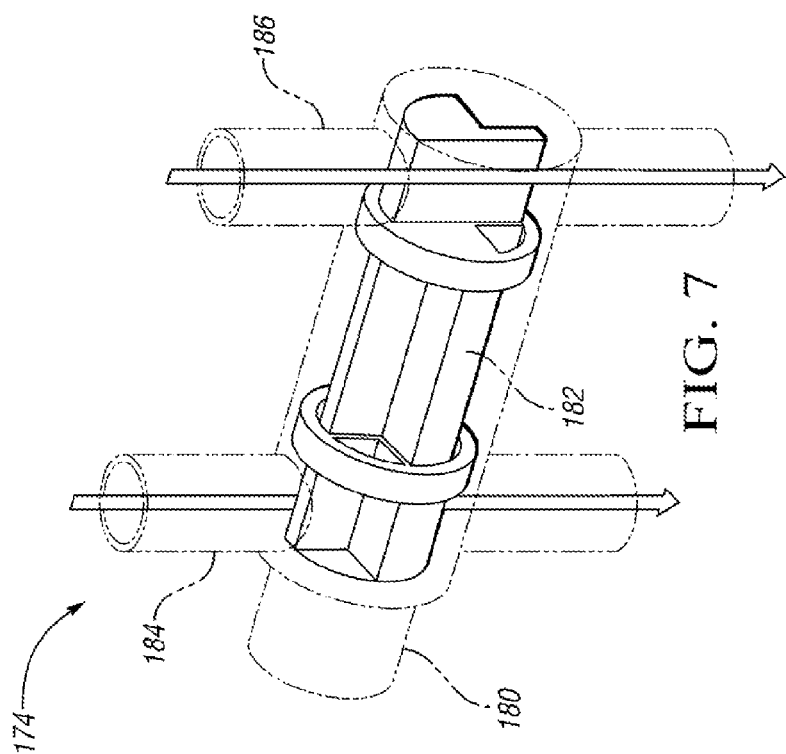
FIG. 7 is a schematic perspective illustration of a valve used in the cooling system of FIGS. 6A-6B with the valve shown in a first position and partially in phantom.

Referring to FIG. 7, the valve 174 is shown in greater detail, having a housing 180 shown in phantom and a rotatable paddle 182. When in the first position of FIG. 7, the paddle 182 directs coolant flow, indicated by arrows, straight through either leg 184, 186 of the valve 174, as indicated in FIG. 6A. When actuated by a control signal from the controller 46, the paddle 182 rotates to the second position of FIG. 8. Coolant flowing into upper and lower portions of leg 184 is directed by the paddle 182 through a midsection 177 to flow in opposite directions out of the leg 186. The paddle 182 is configured to keep the two flow streams separated in the midsection 177 when in the second position.

Figure 9:
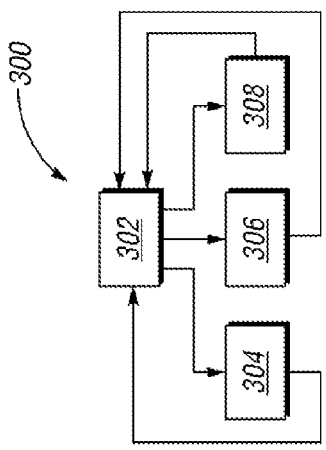
FIG. 9 is a flowchart indicating a method of controlling temperature of a thermoelectric generator in an automotive exhaust system.

Referring to FIG. 9, a method 300 of controlling temperature of a thermoelectric generator such as TEG 10 in an automotive exhaust gas system 11 includes sensing the operating conditions 302. The sensed operating conditions may be temperature within the TEG 10, such as temperature of the hot side heat sink 16, exhaust gas temperature at or near the exhaust inlet 12, or could be related to engine loading as indicated by engine rpm, air pressure or flow rate. Under a first set of sensed operating conditions, the method 300 proceeds to step 304 in which coolant is directed through the TEG 10 in a first direction that opposes the direction of exhaust gas flow, as shown in FIGS. 5A and 6A. For example, the first set of operating conditions may be temperature of the TEG 10 at below the predetermined temperature TP, temperature of the exhaust gas at the inlet 12 at or below another predetermined temperature correlated with the predetermined temperature TP of the TEG 10, engine loading below a predetermined level, or other operating conditions indicative of temperature of the hot side heat sink 16 of the TEG 10 below predetermined temperature TP.

Under a second set of operating conditions, the method 300 instead proceeds to step 306, in which coolant is directed through the TEG 10 in a second direction that is substantially the same as the direction of flow of the exhaust gas, as shown in FIGS. 5B and 6B. The second set of operating conditions may be temperature of the TEG 10 above the predetermined temperature TP and less than the critical temperature TC, temperature of the exhaust gas at the inlet 12 above another predetermined temperature correlated with the predetermined temperature TP of the TEG 10, engine loading above a predetermined level, or other operating conditions indicative of temperature of the hot side heat sink 16 of the TEG 10 above the predetermined temperature TP but below the critical temperature TC. Coolant at its coldest is thus directed to the warmer end of the TEG 10 in order to keep the measured temperature from exceeding the critical temperature TC. Directing coolant under steps 304 and 306 may be by actuating valve 74 and 76, or valve 174 in response to the sensed operating conditions. Next, if the sensor 52 indicates a third set of operating conditions, such as a sensed temperature of TEG 10 greater than the critical temperature TC or other sensed conditions indicative of such, the method 300 continues with step 308, moving the bypass valve 34 to route all or a portion of exhaust gas flow away from the TEG 10. After step 304, 306, or 308, the method 300 returns to step 302 to continue adjusting the position of the cooling system valves 74, 76 or 174 and the bypass valve 34 based on sensed operating conditions.

While the best modes for carrying out the invention have been described in detail, those familiar with the art to which this invention relates will recognize various alternative designs and embodiments for practicing the invention within the scope of the appended claims.

The invention claimed is:

1. An apparatus comprising:
   an engine;
   a thermoelectric generator having an exhaust gas inlet and an exhaust gas outlet;
   an exhaust gas passage operatively connecting the engine and the exhaust gas inlet of the thermoelectric generator to permit exhaust gas flow through the thermoelectric generator from the exhaust gas inlet to the exhaust gas outlet;
   a plurality of coolant flow passages defining a coolant circuit operatively connecting the engine and the thermoelectric generator; wherein the thermoelectric generator has a first coolant port and a second coolant port; wherein the first coolant port is nearer to the exhaust gas outlet than to the exhaust gas inlet; wherein the second coolant port is nearer to the exhaust gas inlet than to the exhaust gas outlet;
   at least one valve positioned in the coolant circuit and movable between a first position and a second position; wherein the at least one valve is in the first position under a first set of operating conditions and is in the second position under a second set of operating conditions; wherein the at least one valve directs coolant flow through the thermoelectric generator from the first coolant port to the second coolant port when in the first position and directs coolant flow through the thermoelectric generator from the second coolant port to the first coolant port when in the second position.

2. The apparatus of claim 1, wherein the first set of operating conditions includes at least one of temperature of the thermoelectric generator less than a predetermined temperature, and exhaust gas temperature upstream of the exhaust gas inlet below another predetermined temperature; and wherein the second set of operating conditions includes at least one of temperature of the thermoelectric generator greater than the predetermined temperature and less than a preselected temperature, and exhaust gas temperature upstream of the exhaust gas inlet above the predetermined temperature and less than the another predetermined temperature.

3. The apparatus of claim 1, wherein the first set of operating conditions includes engine loading below a predetermined load; and wherein the second set of operating conditions includes engine loading above the predetermined load.

4. The apparatus of claim 1, further comprising:
   a bypass valve movable to direct at least a portion of the exhaust gas flow away from the thermoelectric generator under a third set of operating conditions.

5. The apparatus of claim 1, wherein the at least one valve includes a first valve and a second valve; wherein the first valve is configured to direct coolant flow from the engine to the first coolant port and the second valve is configured to direct coolant flow from the second coolant port to the engine when each is in the respective first position; and wherein the first valve is configured to direct coolant flow from the engine to the second coolant port and the second valve is configured to direct coolant flow from the first coolant port to the engine when each is in the respective second position.

6. The apparatus of claim 1, wherein the at least one valve is an H valve configured to direct coolant flow from the engine to the first coolant port and from the second coolant port to the engine when in the first position, and to direct coolant flow from the first coolant port to the engine and from the engine to the second coolant port when in the second position.

7. An apparatus comprising:
   a thermoelectric generator;
   an exhaust gas system operatively connected to the thermoelectric generator to heat a portion of the thermoelectric generator with exhaust gas flow through the thermoelectric generator;
   a coolant system operatively connected to the thermoelectric generator to cool another portion of the thermoelectric generator with coolant flow through the thermoelectric generator;
   at least one valve controllable to cause the coolant to flow through the thermoelectric generator in a direction that opposes a direction of the exhaust gas flow under a first set of operating conditions and to cause the coolant to flow through the thermoelectric generator in the direction of exhaust gas flow under a second set of operating conditions.

8. The apparatus of claim 7, further comprising:
   a bypass valve movable to direct at least a portion of the exhaust gas flow away from the thermoelectric generator under a third set of operating conditions.

9. The apparatus of claim 7, wherein the at least one valve includes a first valve and a second valve; wherein the first valve is configured to direct coolant flow from the engine to a first coolant port of the thermoelectric generator and the second valve is configured to direct coolant flow from a second coolant port of the thermoelectric generator to the engine when each is controlled to be in a respective first position; wherein the first valve is configured to direct coolant flow from the engine to the second coolant port and the second valve is configured to direct coolant flow from the first coolant port to the engine when each is controlled to be in a respective second position; and wherein the second coolant port is nearer the exhaust gas inlet than the first coolant port.

10. The apparatus of claim 7, wherein the at least one valve is an H valve configured to direct coolant flow from the engine to a first coolant port of the thermoelectric generator and from a second coolant port of the thermoelectric generator to the engine when the at least one valve is controlled to be in a first position, and to direct coolant flow from the first coolant port to the engine and from the engine to the second coolant port when the at least one valve is controlled to be in a second position; and wherein the second coolant port is nearer the exhaust gas inlet than the first coolant port.

11. A method for controlling temperature of a thermoelectric generator in an automotive exhaust gas system comprising:
    directing coolant in a first direction through the thermoelectric generator under a first set of operating conditions; and
    directing coolant in a second direction opposing the first direction through the thermoelectric generator under a second set of operating conditions; wherein exhaust gas flows through the thermoelectric generator in the second direction under both the first and the second sets of operating conditions.

12. The method of claim 11, further comprising:
    sensing the operating conditions; and
    wherein the directing coolant in the first and the second directions includes actuating a valve in response to the sensed operating conditions.

13. The method of claim 11, further comprising:
    moving a bypass valve to direct at least a portion of the exhaust gas flow away from the thermoelectric generator under a third set of operating conditions.

\* \* \* \* \*